United States Patent
Won et al.

(10) Patent No.: US 8,451,417 B2
(45) Date of Patent: May 28, 2013

(54) COLOR FILTER DISPLAY PANEL AND FLAT PANEL DISPLAY INCLUDING THE SAME

(75) Inventors: Yu-Bong Won, Yongin (KR); Deok-Hoi Kim, Yongin (KR); Seung-Hoon Moon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 250 days.

(21) Appl. No.: 13/035,775

(22) Filed: Feb. 25, 2011

(65) Prior Publication Data
US 2011/0299002 A1 Dec. 8, 2011

(30) Foreign Application Priority Data
Jun. 7, 2010 (KR) .......................... 10-2010-0053461

(51) Int. Cl.
*G02F 1/1339* (2006.01)
*G02F 1/1333* (2006.01)
*G02F 1/1335* (2006.01)

(52) U.S. Cl.
USPC ........... 349/155; 349/158; 349/106; 349/110; 349/114

(58) Field of Classification Search
USPC .......................... 349/155, 158, 106, 110, 114
See application file for complete search history.

(56) References Cited

U.S. PATENT DOCUMENTS

| 7,812,918 B2 * | 10/2010 | Choi et al. | 349/156 |
| 2007/0097278 A1 * | 5/2007 | Rho et al. | 349/12 |
| 2008/0316419 A1 * | 12/2008 | Choi et al. | 349/190 |

FOREIGN PATENT DOCUMENTS

| KR | 10-2004-0026801 | 4/2004 |
| KR | 10-2006-0000279 | 1/2006 |
| KR | 10-2006-0066271 | 6/2006 |
| KR | 10-2007-0038852 | 4/2007 |
| KR | 10-2008-0079141 | 8/2008 |
| KR | 10-2008-0082086 | 9/2008 |

* cited by examiner

*Primary Examiner* — Mike Qi
(74) *Attorney, Agent, or Firm* — Christie, Parker & Hale, LLP (57) ABSTRACT

A color filter display plate includes a substrate, a light blocking member on the substrate, a color filter on the substrate, a covering layer covering the light blocking member and the color filter, a common electrode on the covering layer, a plurality of support members on the common electrode at locations corresponding to the light blocking member, and a main column spacer, a middle column spacer, and an auxiliary column spacer, each of which is on a corresponding one of the support members, the column spacers having different heights and area ratios.

21 Claims, 9 Drawing Sheets

COLOR FILTER DISPLAY PANEL AND FLAT PANEL DISPLAY INCLUDING THE SAME

CROSS-REFERENCE TO RELATED APPLICATION

This application claims priority to and the benefit of Korean Patent Application No. 10-2010-0053461, filed in the Korean Intellectual Property Office on Jun. 7, 2010, the entire content of which is incorporated herein by reference.

BACKGROUND

1. Field

The described technology relates generally to a color filter display plate and a flat panel display device including the same.

2. Description of the Related Art

Flat panel displays are devices for displaying an image, and include liquid crystal displays (LCDs), organic light emitting diode (OLED) displays, and electrophoretic display (EPD) devices. Particularly, liquid crystal displays (LCDs) are some of the most commonly used flat panel displays. An LCD includes two substrates with electrodes formed thereon and a liquid crystal layer interposed between the two substrates. In LCDs, a voltage is applied to the electrodes to realign liquid crystal molecules of the liquid crystal layer to thereby regulate the transmittance of light passing through the liquid crystal layer.

Upper and lower substrates of the LCD are coupled by a sealant formed at the peripheral edge to seal the liquid crystal molecules, and are supported by a plurality of column spacers forming a constant pattern between the upper and lower substrates to maintain a cell gap (e.g., a predetermined cell gap).

If the plurality of column spacers that maintain the cell gap have the same height, liquid crystal may not be fully inserted between the upper and lower substrates when the liquid crystal lacks (e.g., when the amount of liquid crystal in the liquid crystal layer is insufficient), thereby causing void or cold bubble. Furthermore, the cell gap may not be constantly maintained when the amount of the liquid crystal is excessive, thereby decreasing a liquid crystal margin.

The above information disclosed in this Background section is only for enhancement of understanding of the background of the described technology, and may contain information that does not form the prior art that is already known in this country to a person of ordinary skill in the art.

SUMMARY

Aspects of embodiments of the present invention provide a color filter display plate that can prevent or reduce pooling and smearing and can also improve a liquid crystal margin, and a flat panel display having the same. A color filter display plate according to an exemplary embodiment may include a substrate, a light blocking member on the substrate, a color filter on the substrate, a covering layer covering the light blocking member and the color filter, a common electrode on the covering layer, a plurality of support members on the common electrode at locations corresponding to the light blocking member, and a main column spacer, a middle column spacer, and an auxiliary column spacer, each of which is on a corresponding one of the support members, the column spacers having different heights and area ratios.

The height of the middle column spacer may be less than that of the main column spacer and greater than that of the auxiliary column spacer.

Each of the area ratios may be calculated by multiplying an area of a horizontal cross-section of a corresponding one of the main column spacer, the middle column spacer, or the auxiliary column spacer with a number of the respective column spacer per unit area.

The support members may include a photo-curable organic or metal layer.

The middle column spacer may include a plurality of sub-middle column spacers, each having a different height or area ratio.

The main column spacer may include a plurality of sub-main column spacers, each having a different height or area ratio.

The auxiliary column spacer may include a plurality of sub-auxiliary column spacers, each having a different height or area ratio.

A color filter display plate according to another exemplary embodiment may include a substrate including a reflecting portion and a transmitting portion, a light blocking member on the substrate, a color filter on the substrate and covering a part of the light blocking member, a covering layer covering the light blocking member and the color filter, a common electrode on the covering layer, a cell gap control layer on the common electrode in the reflecting portion, a plurality of support members on the common electrode in the transmitting portion of the substrate at locations corresponding to the light blocking member, and a main column spacer, a middle column spacer, and an auxiliary column spacer on the cell gap control layer and a corresponding one of the support members, the column spacers having different heights.

The cell gap control layer may include the same material as that of the support members.

The height of the middle column spacer may be less than that of the main column spacer and greater than that of the auxiliary column spacer.

An area ratio may be calculated by multiplying an area of a horizontal cross-section of a corresponding one of the main column spacer, the middle column spacer, or the auxiliary column spacer with a number of the respective column spacer per unit area, the main column spacer, the middle column spacer, and the auxiliary column spacer having different area ratios.

The support members may include a photo-curable organic or metal layer.

A flat panel display according to another exemplary embodiment may include a color filter display plate, and a thin film transistor display plate facing the color filter display plate and including a lower substrate, a gate line on the lower substrate, a data line crossing the gate line in an insulated manner, a thin film transistor coupled with the gate line and the data line, a pixel electrode coupled with the thin film transistor, a plurality of support members, each of which is at a location corresponding to one of the gate line, the data line, or the thin film transistor, and a main column spacer, a middle column spacer, and an auxiliary column spacer on the support members and having different heights.

The flat panel display may further include a passivation layer covering the thin film transistor, wherein the support members are on the passivation layer.

The height of the middle column spacer may be less than that of the main column spacer and greater than that of the auxiliary column spacer.

An area ratio may be calculated by multiplying an area of a horizontal cross-section of a corresponding one of the main column spacer, the middle column spacer, or the auxiliary column spacer with a number of the respective column spacer per unit area, the main column spacer, the middle column spacer, and the auxiliary column spacer having different area ratios.

A flat panel display according to another exemplary embodiment may include a color filter display plate, and a thin film transistor display plate facing the color filter display plate and including a lower substrate including a reflecting portion and a transmitting portion, a gate line on the lower substrate, a data line crossing the gate line in an insulated manner, a thin film transistor coupled with the gate line and the data line, a pixel electrode coupled with the thin film transistor, a reflective electrode on a pixel electrode of the reflecting portion, a cell gap control layer on the reflective electrode, a plurality of support members, each of which is at a location corresponding to one of the gate line, the data line, or the thin film transistor in the transmitting portion, and a main column spacer, a middle column spacer, and an auxiliary column spacer on the cell gap control layer and on the support members and having different heights.

The flat panel display may further include a passivation layer covering the thin film transistor, wherein the support members are on the passivation layer.

The cell gap control layer may include the same material as that of the support members.

The height of the middle column spacer may be less than that of the main column spacer and greater than that of the auxiliary column spacer.

An area ratio may be calculated by multiplying an area of a horizontal cross-section of a corresponding one of the main column spacer, the middle column spacer, or the auxiliary column spacer with a number of the respective column spacer per unit area, the main column spacer, the middle column spacer, and the auxiliary column spacer having different area ratios.

According to embodiments of the present invention, pooling and smearing can be prevented or reduced by forming the main column spacer, the middle column spacer, and the auxiliary column spacer, each having a different height and a different area ratio, and the liquid crystal margin can also be increased.

In addition, the support members are formed under the main column spacer, the middle column spacer, and the auxiliary column spacer to prevent or reduce pooling and smearing when a pressure is applied.

DETAILED DESCRIPTION

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Constituent elements having the same structures throughout the embodiments are denoted by the same reference numerals, and are described in a first exemplary embodiment. In the subsequent exemplary embodiments, only the constituent elements other than the same constituent elements are described.

Some of the parts irrelevant to the description are omitted in order to clearly describe embodiments of the present invention, and like reference numerals designate like elements throughout the specification.

Furthermore, as the size and thickness of the respective structural components shown in the drawings are arbitrarily illustrated for explanatory convenience, the present invention is not necessarily limited to the illustrated (e.g., to the dimensions and the proportions of the illustrated).

In the drawings, for better understanding and ease of description, the thickness of layers, films, panels, regions, etc., are exaggerated for clarity. Furthermore, it will be understood that when an element such as a layer, film, region, or substrate is referred to as being "on" another element, it can be directly on the other element or intervening elements may also be present. It will also be understood that when an element is referred to as being "coupled" to another element, it may be directly connected to the other element, or may be connected to the other element via one or more other elements.

A main column spacer and an auxiliary column spacer (e.g., a double column spacer) may be formed with different heights to increase the liquid crystal margin and to thereby decrease void or cold bubble.

However, when the main column spacer and the auxiliary column spacer have different heights, pooling and smearing occur more easily than with an LCD having single-type column spacers having the same height. When a pressure is applied to the LCD, pooling causes a peripheral area of the pressed area to appear stained, and smearing causes the pressed portion to appear stained. The smearing is also referred to as bruising. When the LCD has single-type column spacers, entire portions of the LCD have the same cell gap, so that no pooling or smearing occurs when the LCD is pressed. However, the liquid crystal margin is decreased, thereby causing void or cold bubble.

Figure 1:
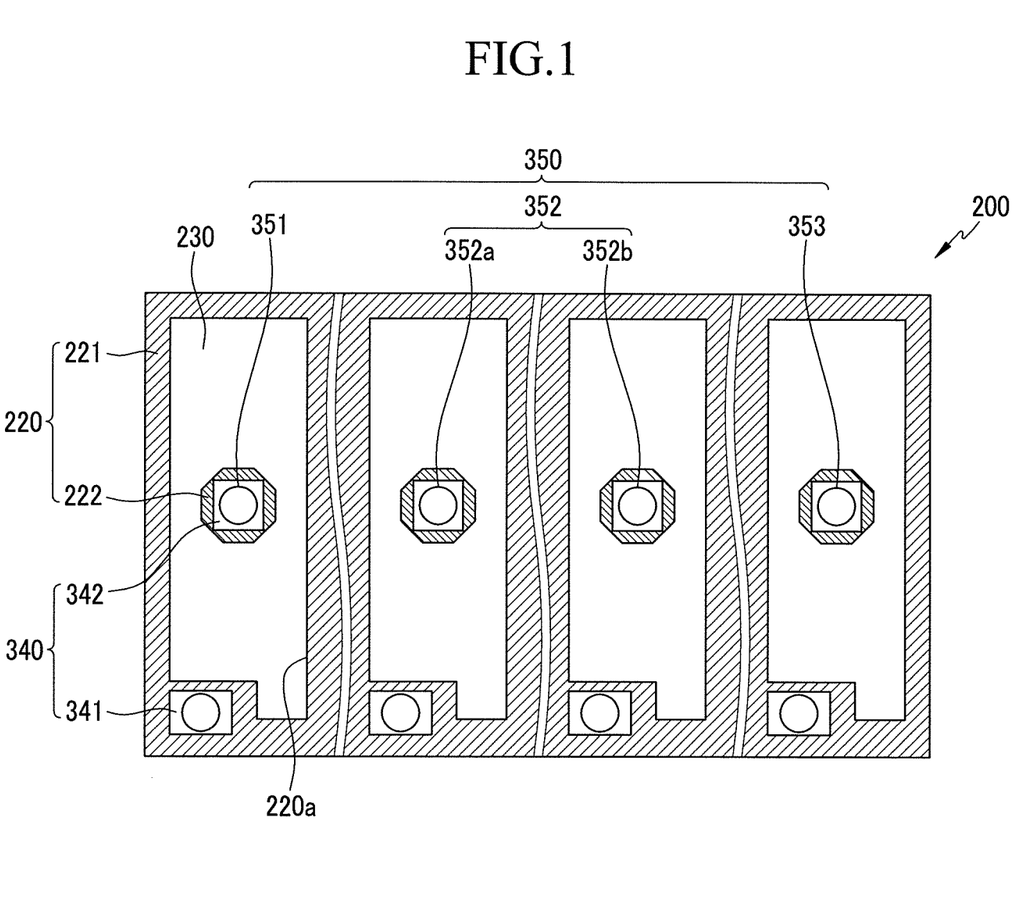
FIG. 1 is a layout view of a color filter display plate according to a first exemplary embodiment of the present invention.
Figure 2:
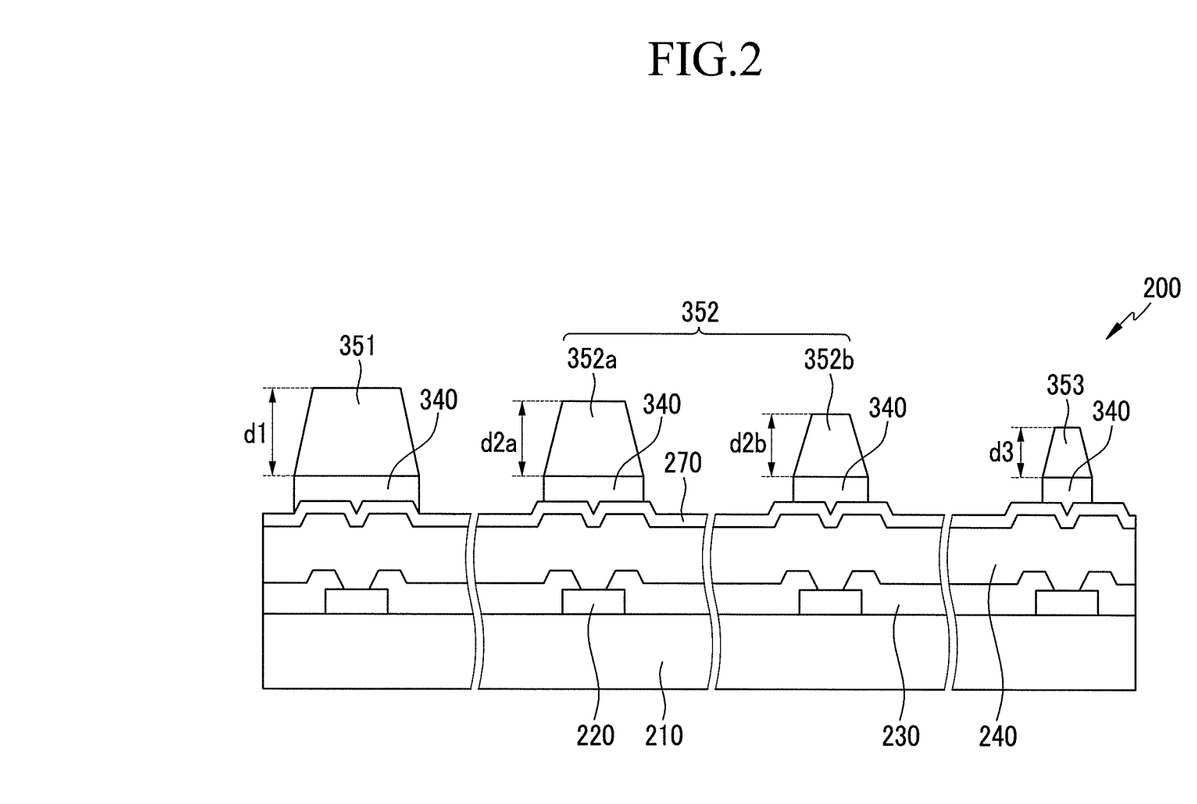
FIG. 2 is a cross-sectional view of the color filter display plate of the first exemplary embodiment shown in FIG. 1.

Referring to FIG. 1 and FIG. 2, a color filter display plate 200 according to a first exemplary embodiment of the present invention will be described in further detail.

FIG. 1 is a layout view of a color filter display plate 200 according to a first exemplary embodiment, and FIG. 2 is a cross-sectional view of the color filter display plate 200 of the first exemplary embodiment shown in FIG. 1.

As shown in FIG. 1 and FIG. 2, a light blocking member 220 is formed on a transparent upper substrate 210 such as glass. The light blocking member 220 may be formed with metal, such as chromium, or an organic material. The light blocking member 220 includes a matrix-type light blocking member 221 having a plurality of opening areas 220a exposing the upper substrate 210, and an ohmic-type light blocking member 222 formed in the opening area 220a of the matrix-type light blocking member 221. One opening area 220a of the matrix-type light blocking member 221 corresponds to one pixel, and the opening area 220a of the matrix-type light blocking member 221 has a rectangular shape, and the matrix-type light blocking member 221 protrudes from the lower-left portion of the opening area 220a. In addition, the ohmic light blocking member 222 may have various cross-sectional shapes such as a circle, a quadrangle, a hexagon, an oval, and a polygon, such as the ohmic light blocking member 222 according to the first exemplary embodiment, which has an octagonal shape.

A plurality of color filters 230 are formed on the upper substrate 210 and the light blocking member 220, and the color filters 230 are arranged to be fit into the opening area 220a defined by the light blocking member 220. Each color filter 230 may represent one of the primary colors of red, green, and blue. A covering layer 240 of an organic material is formed on the color filter 230. The covering layer 240 protects the color filter 230 from an etching solution of a common electrode 270.

The common electrode 270, which receives a common voltage and is formed with a transparent conductive material, such as ITO or IZO, is formed on the color filter 230.

A support member 340, which may include a plurality of separate portions or a plurality of separate support members, is formed at a place or places on the common electrode 270 corresponding to the light blocking member 220. The support member 340 includes a first support member 341 formed on the matrix-type light blocking member 221, and a second support member 342 formed on the ohmic light blocking member 222. The support member 340 may have various shapes, such as a circle, a quadrangle, a hexagon, an oval, and a polygon, and may be formed with a photo-curable organic or metal layer. The support member 340 supports a column spacer 350, which may include a plurality of separate portions, to thereby prevent or reduce pooling or smearing that may occur when a pressure is applied.

The column spacers 350 may include a main column spacer 351, a middle column spacer 352, and an auxiliary column spacer 353, each having a different height and being formed on the support member 340. A height d1 of the main column spacer 351 is the greatest and a height d3 of the auxiliary column spacer 353 is the least, and heights d2a and d2b of the middle column spacer 352 are less than the height d1 of the main column spacer 351 and greater than the height d3 of the auxiliary column spacer 353. The main column spacer 351, the middle column spacer 352, and the auxiliary column spacer 353 may respectively include a plurality of sub-main column spacers, a plurality of sub-middle column spacers (e.g., 352a and 352b), and a plurality of sub-auxiliary column spacers, each having a different height. In the described exemplary embodiment, a first sub-middle column spacer 352a has a height greater than that of a second sub-middle column spacer 352b.

The column spacer 350 may be formed using a photo mask 1000 (see FIG. 3) formed by stacking layers having different transmittances.

Figure 3:
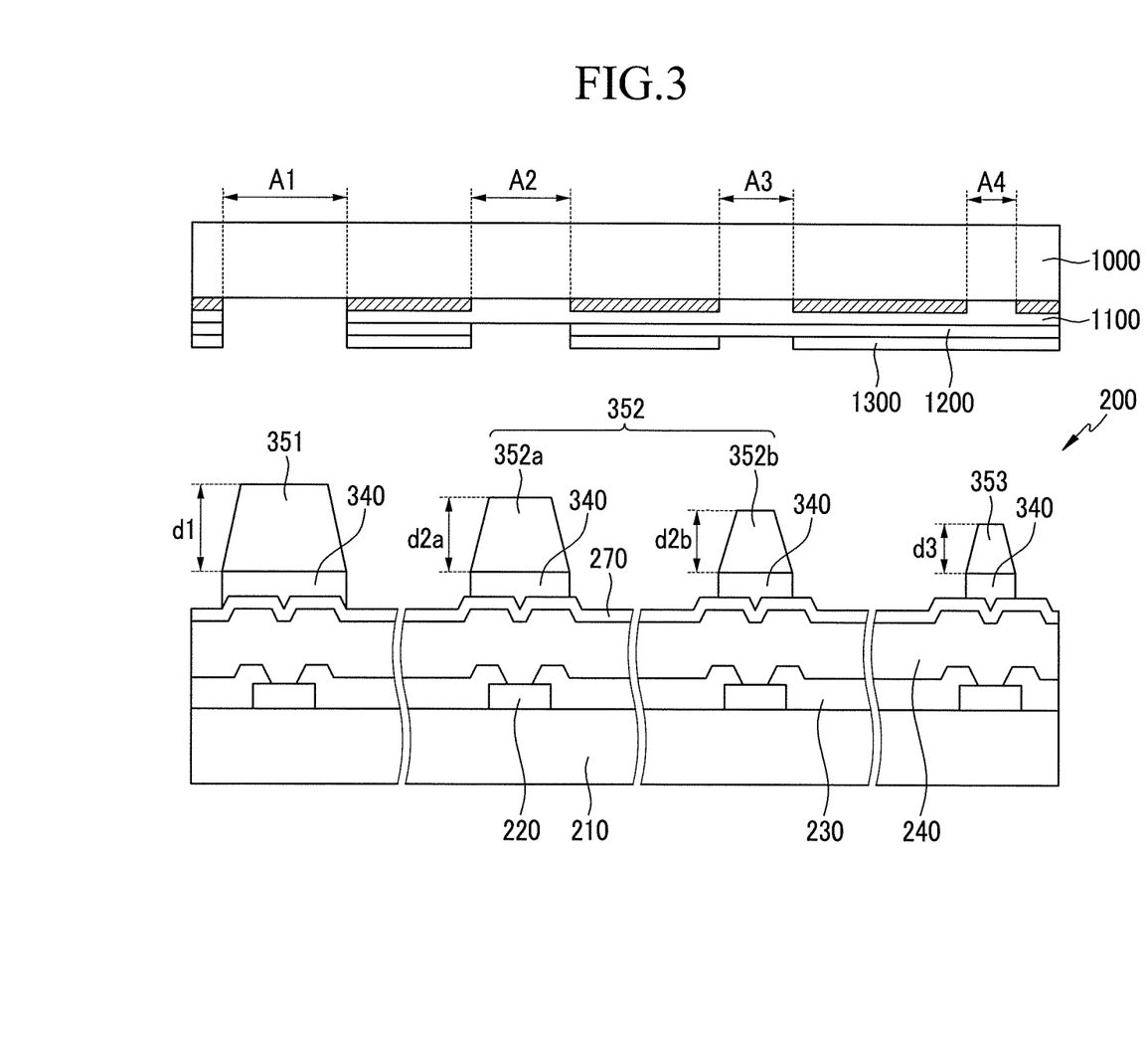
FIG. 3 shows a method for manufacturing the color filter display plate according to the first exemplary embodiment using an optical mask.

FIG. 3 shows a method for manufacturing the color filter display plate 200 using the photo mask according to the first exemplary embodiment.

As shown in FIG. 3, the photo mask 1000 includes a first area A1 where a transmittance is about 100%, a second area A2 where the transmittance is about 70%, a third area A3 where the transmittance is about 50%, and a fourth area A4 where the transmittance is less than about 30%. Three thin films 1100, 1200 and 1300 are formed in the fourth area A4 of the photo mask 1000, two thin films 1100 and 1200 are stacked in the third area A3 of the photo mask 1000, and the thin film 1100 is stacked in the second area A2. Thus, the main column spacer 351 corresponds to the first area A1 having a transmittance of about 100% of the photo mask 1000, the first sub-middle column spacer 352a corresponds to the second area A2 having a transmittance of about 70% of the photo mask 1000, the second sub-middle column spacer 352b corresponds to the third area A3 having a transmittance of about 50% of the photo mask 1000, and the auxiliary column spacer 353 corresponds to the fourth area A4 having a transmittance of less than about 30% of the photo mask 1000.

Figure 8:
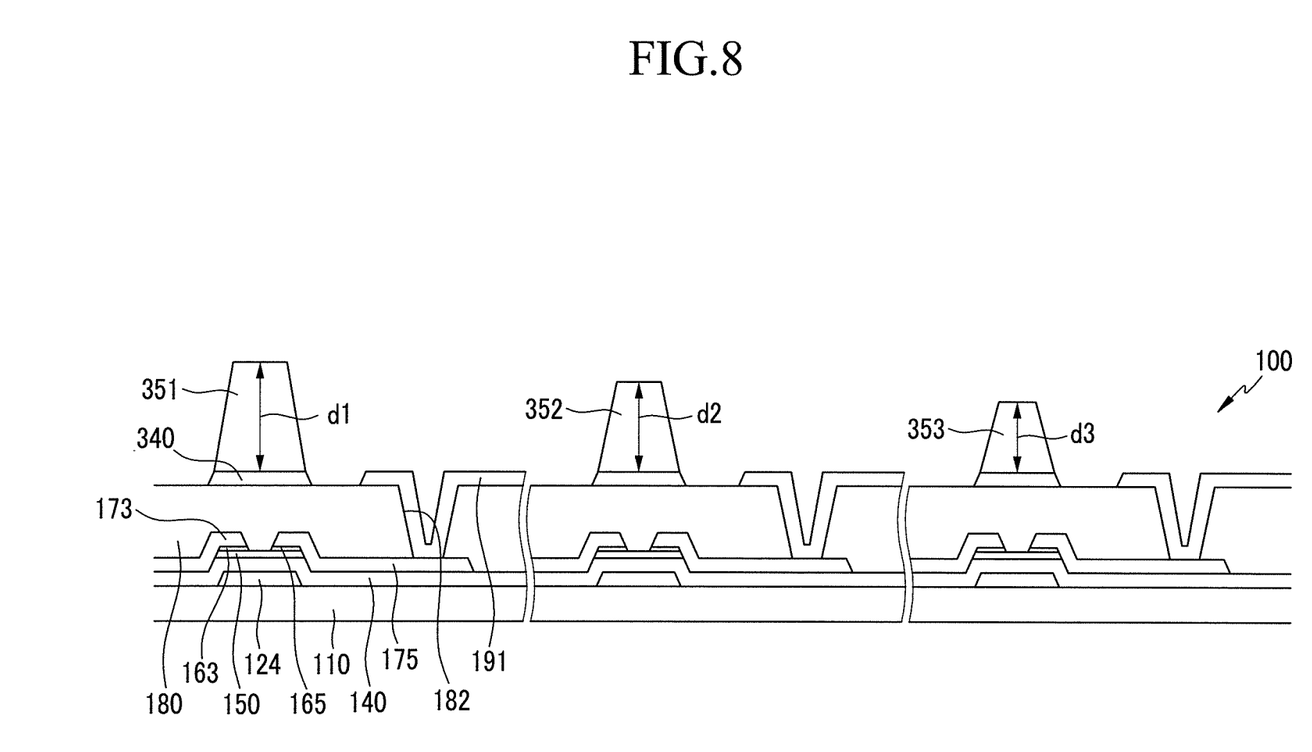
FIG. 8 is a cross-sectional view of an LCD according to a sixth exemplary embodiment of the present invention.

Since the main column spacer 351 has the greatest height, it maintains a cell gap between the color filter display plate 200 and the thin film transistor display plate 100 (see FIG. 8).

Since the height of the auxiliary column spacer 353 is less than that of the main column spacer 351 and the middle column spacer 352, it can guarantee (or reasonably guarantee) a space for movement of liquid crystal. Thus, the auxiliary column spacer 353 improves the liquid crystal margin to prevent or reduce void or cold bubble.

Since the height of the middle column spacer 352 is less than that of the main column spacer 351 and greater than that of the auxiliary column spacer 353, void or cold bubble that may otherwise occur when only the main column spacer 351 is used can be prevented or reduced, and pooling or smearing that may otherwise occur when only the main column spacer 351 and the auxiliary column spacer 353 are used can be prevented or reduced.

Horizontal cross-sections of the main column spacer 351, middle column spacer 352, and auxiliary column spacer 353 may have various shapes including, for example, a circle, a quadrangle, a hexagon, an oval, and a polygon.

Furthermore, the main column spacer 351, the middle column spacer 352, and the auxiliary column spacer 353 may be different from each other in a ratio of areas (e.g., area ratios) SR.

The area ratio SR of the column spacer 350 can be defined as given in Equation 1.

$$SR(\%) = S(\mu m^2) * E(ea/cm^2)/10^6 \qquad \text{[Equation 1]}$$

Here, S is an area of a horizontal cross-section of the column spacer 350 and E is the number of column spacers 350 per unit area. For example, if the area S of the horizontal cross-section of the column spacer 350 is 154 $\mu m^2$ and the number E of column spacers 350 per unit area is 667 ea/cm$^2$, the area ratio SR of the column spacer 350 becomes 0.1%.

The area ratio of the main column spacer 351 may be between about 0.1% to about 0.3%. When the area ratio of the main column spacer 351 is less than about 0.1%, pooling or smearing may easily occur, and when the area ratio of the main column spacer 351 is greater than about 0.3%, the liquid crystal margin is decreased so that void or cold bubble may be more easily generated. In this case, the height of the main column spacer 351 may be between about 2.3 µm to about 2.4 µm.

The area ratio of the middle column spacer 352 may be about 0.2% to about 1.0%. When the area ratio of the middle column spacer 352 is less than about 0.2%, pooling or smearing may easily occur, and when the area ratio of the middle column spacer 352 is greater than about 1.0%, the liquid crystal margin is decreased so that void or cold bubble may be easily generated. In this case, the height of the middle column spacer 352 may be less than that of the main column spacer 351, and between about 1.9 µm to about 2.2 µm.

In this case, the area ratio of the first sub-middle column spacer 352a may be about 0.2% to about 0.5%, the height of the first sub-middle column spacer 352a may be about 2.1 μm to about 2.2 μm, the area ratio of the second sub-middle column spacer 352b may be about 0.5% to about 1.0%, and the height of the second sub-middle column spacer 352b may be about 1.9 μm to about 2.0 μm.

The area ratio of the auxiliary column spacer 353 may be about 1.0% to about 2.0%. When the area ratio of the auxiliary column spacer 353 is less than about 1.0%, the area ratios of the main column spacer 351 and the middle column spacer 352 are increased so that the liquid crystal margin is decreased, thereby causing void or cold bubble. When the area ratio of the auxiliary column spacer 353 is greater than about 2.0%, the area ratios of the main column spacer 351 and the middle column spacer 352 are relatively decreased, and therefore pooling and smearing may occur more easily.

As described, the main column spacer 351, the middle column spacer 352, and the auxiliary column spacer 353 have different heights and area ratios to prevent or reduce pooling and smearing while also increasing the liquid crystal margin.

The pattern of the light blocking member 220 of the color filter display plate 200 according to the first exemplary embodiment may be variously modified. Hereinafter, various modifications will be described with several exemplary embodiments in further detail.

Figure 4:
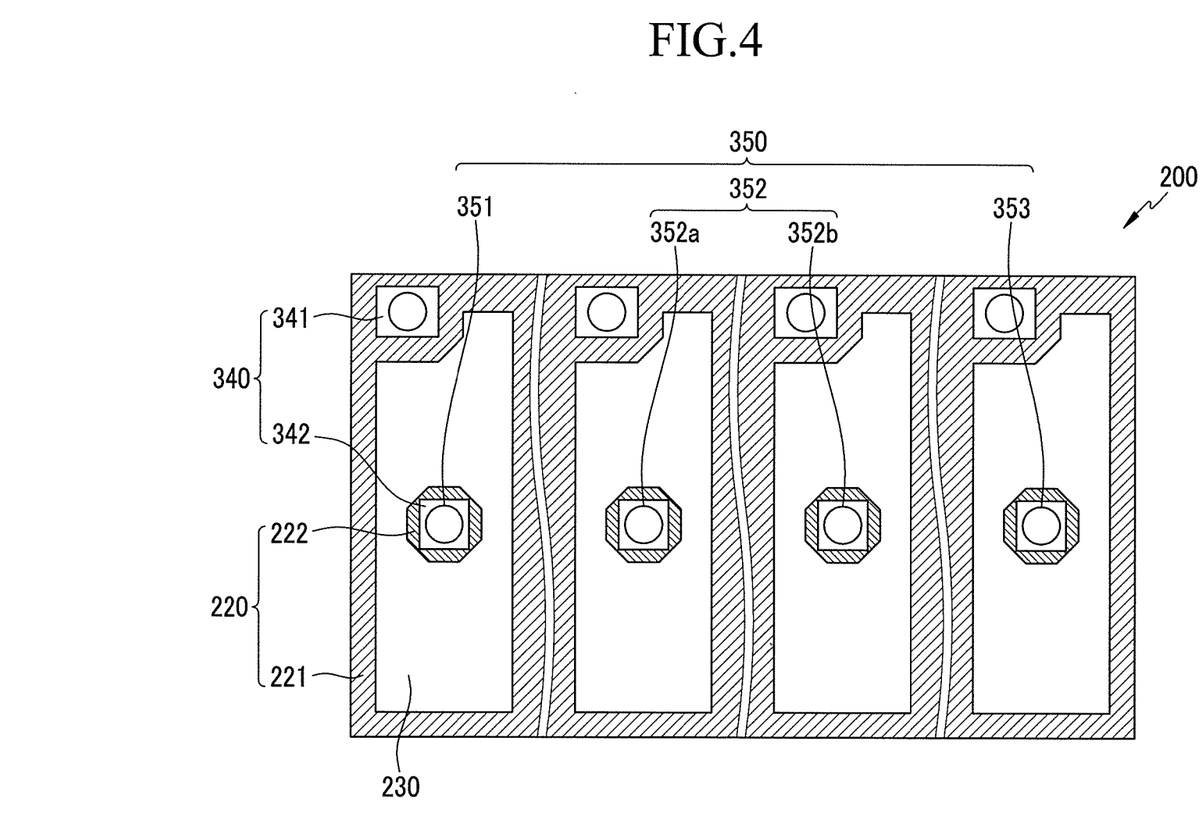
FIG. 4 is a layout view of a color filter display plate according to a second exemplary embodiment of the present invention.

FIG. 4 is a layout view of a color filter display plate 200 according to a second exemplary embodiment of the present invention.

The second exemplary embodiment is substantially the same as the first exemplary embodiment shown in FIG. 1 and FIG. 2, with an exception being that the shape of a matrix-type light blocking member 221 is different from that of the first exemplary embodiment, and therefore description of the same elements of the first exemplary embodiment will be omitted.

As shown in FIG. 4, a light blocking member 220 includes a matrix-type light blocking member 221 having a plurality of opening areas 220a that expose an upper substrate 210 (see FIG. 2 and FIG. 3) and an ohmic light blocking member 222 formed in each of the opening areas 220a of the matrix-type light blocking member 221. The opening area 220a of the matrix-type light blocking member 221 has a rectangular shape, and the matrix-type light blocking member 221 protrudes from an upper-left portion of the opening area 220a. In addition, the ohmic light blocking member 222 may have various shapes such as a circle, a quadrangle, a hexagon, an oval, and a polygon, such as the ohmic light blocking member 222 in the second exemplary embodiment, which has an octagonal shape.

Figure 5:
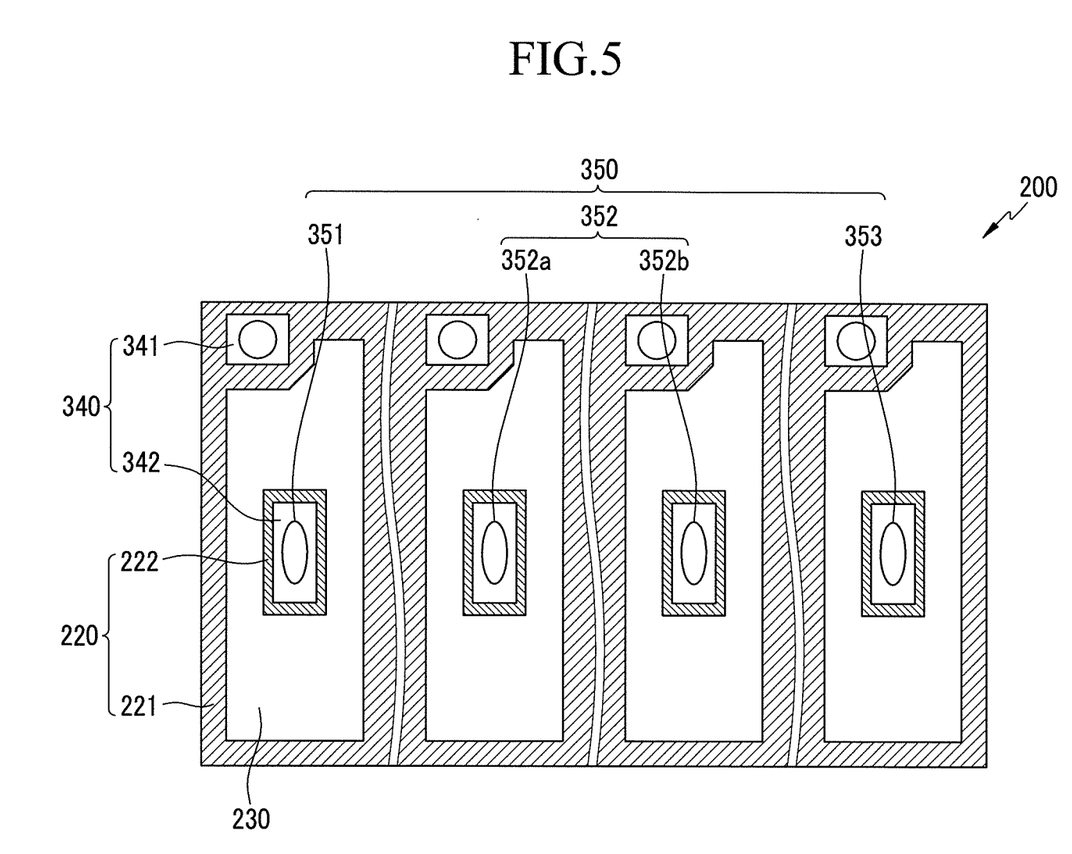
FIG. 5 is a layout view of a color filter display plate according to a third exemplary embodiment of the present invention.

FIG. 5 is a layout view of a color filter display plate 200 according to a third exemplary embodiment of the present invention.

The third exemplary embodiment is substantially the same as the second exemplary embodiment shown in FIG. 4, with the exception of the shape of an ohmic light blocking member 222 and the shape of a second support member 342, and therefore description of the same elements as in the first exemplary embodiment will be omitted.

As shown in FIG. 5, a light blocking member 220 includes a matrix-type light blocking member 221 having a plurality of opening areas 220a that expose an upper substrate 210 (see FIG. 2 and FIG. 3), and an ohmic light blocking member 222 formed in each of the opening areas 220a of the matrix-type light blocking member 221. The opening area 220a of the matrix-type light blocking member 221 has a rectangular shape, and the matrix-type light blocking member 221 protrudes from an upper-left portion of the opening area 220a. In addition, the ohmic light blocking member 222 has a rectangular shape erected (e.g., oriented) in a length direction. A plurality of color filters 230 are formed on the upper substrate 210 and the light blocking member 220, a covering layer 240 (see FIG. 2 and FIG. 3) formed with an organic material and the like is formed on the color filters 230, and a common electrode 270 (see FIG. 2 and FIG. 3) is formed on the covering layer 240.

A support member 340 is formed at a location above the common electrode 270 and corresponding to the light blocking member 220. The support member 340 includes a first support member 341 formed on the matrix-type light blocking member 221 and a second support member 342 formed on the ohmic light blocking member 222. The second support member 342 has a rectangular shape. A main column spacer 351, a middle column spacer 352, and an auxiliary column spacer 353, each having different heights and area ratios, are formed on the support member 340, and a column spacer 350 formed on the second support member 342 may have a different shape than that of a column spacer 350 formed on the first support member 341. In the third exemplary embodiment, a horizontal cross-section of the column spacer 350 (e.g., column spacers 351, 352a, 352b, and 353, individually) formed on the second support member 342 has an oval shape.

Figure 6:
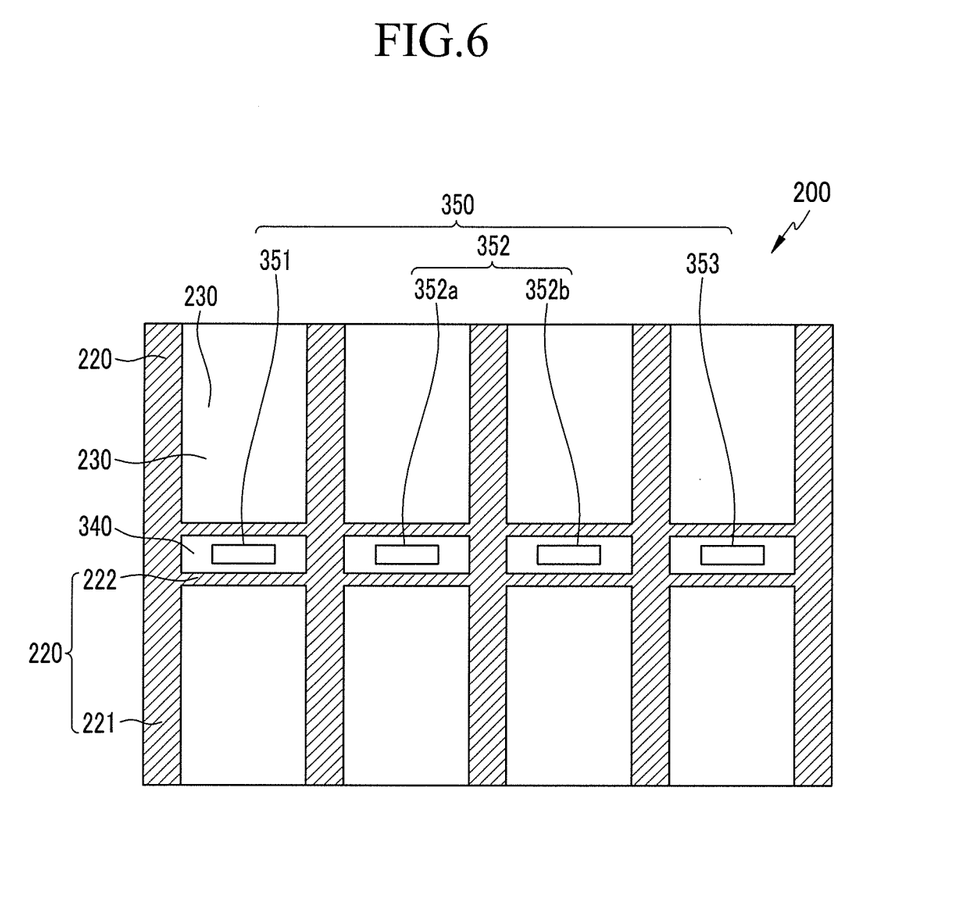
FIG. 6 is a layout view of a color filter display plate according to a fourth exemplary embodiment of the present invention.

FIG. 6 is a layout view of a color filter display plate 200 according to a fourth exemplary embodiment of the present invention.

The fourth exemplary embodiment is substantially the same as the first exemplary embodiment of the present invention shown in FIG. 1 and FIG. 2, except for the shape of the ohmic light blocking member and the shape of a second support member, and therefore, description of the same elements as in the first exemplary embodiment will be omitted.

As shown in FIG. 6, a light blocking member 220 includes a matrix-type light blocking member 221 having a plurality of opening areas 220a that expose an upper substrate 210 (see FIG. 2 and FIG. 3) and an ohmic light blocking member 222 formed in each of the opening areas 220a of the matrix-type light blocking member 221. The opening area 220a of the matrix-type light blocking member 221 has a rectangular shape, and the ohmic light blocking member 222 has a rectangular shape crossing the opening area 220a of the matrix-type light blocking member 221. A plurality of color filters 230 are formed on the upper substrate 210 and the light blocking member 220, a covering layer 240 (see FIG. 2 and FIG. 3) formed with an organic material and the like is formed on the color filters 230, and a common electrode 270 (see FIG. 2 and FIG. 3) is formed on the covering layer 240. A support member 340 is formed at a location above the common electrode 270 and corresponding to the light blocking member 220. The support member 340 has a rectangular shape and is formed on the ohmic light blocking member 222. A main column spacer 351, a middle column spacer 352, and an auxiliary column spacer 353, each having a different height and area ratio, are formed on the support member 340, and a column spacer 350 formed on the support member 340 (which may be a second support member 342) has a rectangular horizontal cross-section.

In the above description, an additional support member is formed under the column spacer 350 of the color filter display plate 200 of the transmissive LCD. However, in a transflective LCD, a column spacer 350 is formed on a cell gap control layer 380 (see FIG. 7) of a reflecting portion in a color filter display plate 200 and a support member 340 is formed with the same material as that of the cell gap control layer 380 in a transmitting portion to thereby prevent or reduce pooling and smearing.

Hereinafter, a transflective LCD according to a fifth exemplary embodiment of the present invention will be described with reference to FIG. 7.

Figure 7:
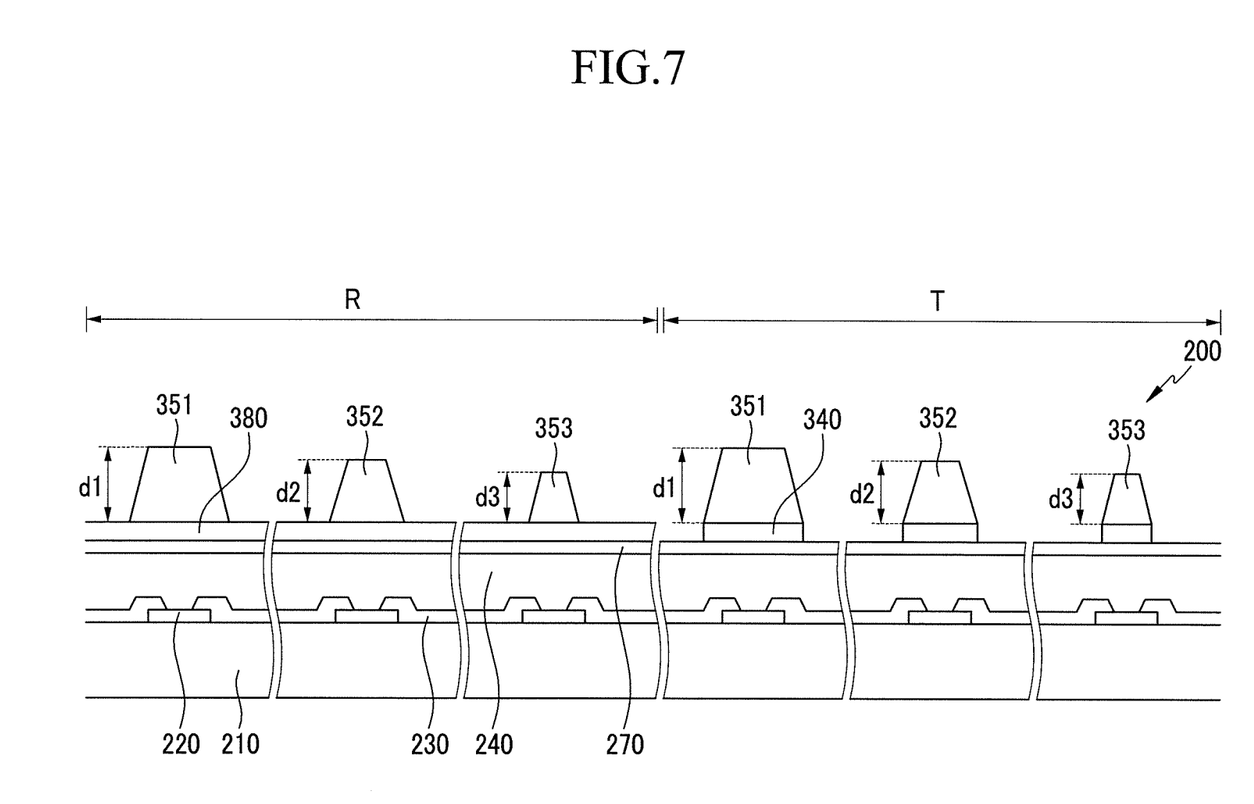
FIG. 7 is a cross-sectional view of a color filter display plate according to a fifth exemplary embodiment of the present invention.

FIG. 7 is a cross-sectional view of a color filter display plate 200 according to a fifth exemplary embodiment of the present invention.

As shown in FIG. 7, a color filter display plate 200 of a transflective LCD includes a transmitting portion T, through which light from a backlight device is passed, and a reflecting portion R that reflects incident light incident from an external side.

A layered structure that is the same as that of the color filter display plate 200 according to the first exemplary embodiment shown in FIG. 1 and FIG. 2 is formed in the transmitting portion T. That is, a support member 340 is formed at a location above a common electrode 270 and corresponding to the light blocking member 220, and the support member 340 may be formed with a photo-curable organic layer. The support member 340 supports the column spacer 350 so that pooling or smearing that may occur due to pressure can be prevented or reduced. A main column spacer 351, a middle column spacer 352, and an auxiliary column spacer 353, respectively having different heights d1, d2, and d3 and different area ratios, are formed on the support member 340 so that pooling or smearing can be prevented or reduced while a liquid crystal margin can be improved.

In addition, a cell gap control layer 380 is formed on the common electrode 270 in the reflecting portion R. The cell gap control layer 380 may be formed with the same material as that of the support member 340. The cell gap control layer 380 controls (e.g., causes) a cell gap of the reflecting portion R to be smaller than that of the transmitting portion T, so as to make a phase delay of light in the reflecting portion R almost equivalent to that in the transmitting portion T. Thus, color reproducibility can be uniform, or substantially uniform, in the reflecting portion R and the transmitting portion T so that a display characteristic of the LCD can be improved.

A main column spacer 351, a middle column spacer 352, and an auxiliary column spacer 353, respectively having different heights and different area ratios, are formed on the cell gap control layer 380, and the cell gap control layer 380 supports the main column spacer 351, the middle column spacer 352, and the auxiliary column spacer 353, so that pooling or smearing that may occur due to pressure can be prevented or reduced.

In the above-described exemplary embodiment, the main column spacer 351, the middle column spacer 352, and the auxiliary column spacer 353, which are different in height and in area ratio, are formed in the color filter display plate 200 of the LCD. However, they may be formed in a thin film transistor display plate 100 (see FIG. 8) of the LCD.

Hereinafter, an LCD according to a sixth exemplary embodiment of the present invention will be described with reference to FIG. 8.

FIG. 8 is a cross-sectional view of an LCD according to a sixth exemplary embodiment of the present invention.

As shown in FIG. 8, a thin film transistor display plate 100 includes a lower substrate 110 formed with transparent glass or plastic, and also includes a gate line and a gate electrode 124 formed on the lower substrate 110.

On the gate line and gate electrode 124, a gate insulating layer 140 is formed with, for example, a silicon nitride (SiNx) or silicon oxide (SiOx). A semiconductor layer 150 including amorphous silicon (a-Si) is formed on the gate insulating layer 140. The semiconductor layer 150 overlaps the gate electrode 124. Ohmic contacts 163 and 165 are formed on the semiconductor layer 150. The ohmic contacts 163 and 165 may be formed with silicide, or with n+ hydrogenated amorphous silicon in which n-type impurities are doped at a high concentration. A data line and a drain electrode 175 are formed on the ohmic contacts 163 and 165 and the gate insulating layer 140. The data line transmits a data signal, and extends in the vertical direction such that it crosses the gate line. The data line includes a source electrode 173 extended toward the gate electrode 124. The drain electrode 175 faces the source electrode 173, with the gate electrode 124 therebetween. One gate electrode 124, one source electrode 173, and one drain electrode 175 form one thin film transistor (TFT) together with the semiconductor layer 150, and a channel of the thin film transistor is formed in the semiconductor layer 150 between the source electrode 173 and the drain electrode 175. A passivation layer 180 is formed on the data line, the drain electrode 175, and an exposed portion of the semiconductor layer 150. The passivation layer 180 may be formed with an inorganic insulator such as silicon nitride and silicon oxide, an organic insulator, or a low electric constant insulator. A contact hole 182 that exposes the drain electrode 175 is formed in the passivation layer 180, and a pixel electrode 191 is formed on the passivation layer 180. The pixel electrode 191 may be formed with a transparent conductive material such as ITO and IZO, or with a reflective material such as aluminum, silver, and alloys thereof.

A support member 340 is formed at a location on the passivation layer 180 corresponding to the gate line, the data line, or the thin film transistor. The support member 340 is formed of a photo-curable organic layer or a metal layer and supports the column spacer 350, and therefore pooling or smearing that may occur due to pressure can be prevented or reduced. A main column spacer 351, a middle column spacer 352, and an auxiliary column spacer 353, each having a different height and a different area ratio, are formed on the support member 340.

In addition, a color filter display plate 200 is formed facing the thin film transistor display plate 100 and on the thin film transistor display plate 100, and a gap between the color filter display plate 200 and the thin film transistor display plate 100 is maintained by the column spacer 350. A liquid crystal layer is formed between the color filter display plate 200 and the thin film transistor display plate 100.

As described, pooling and smearing can be prevented or reduced and the liquid crystal margin can also be improved by forming the main column spacer 351, the middle column spacer 352, and the auxiliary column spacer 353 with different heights and area ratios.

Figure 9:
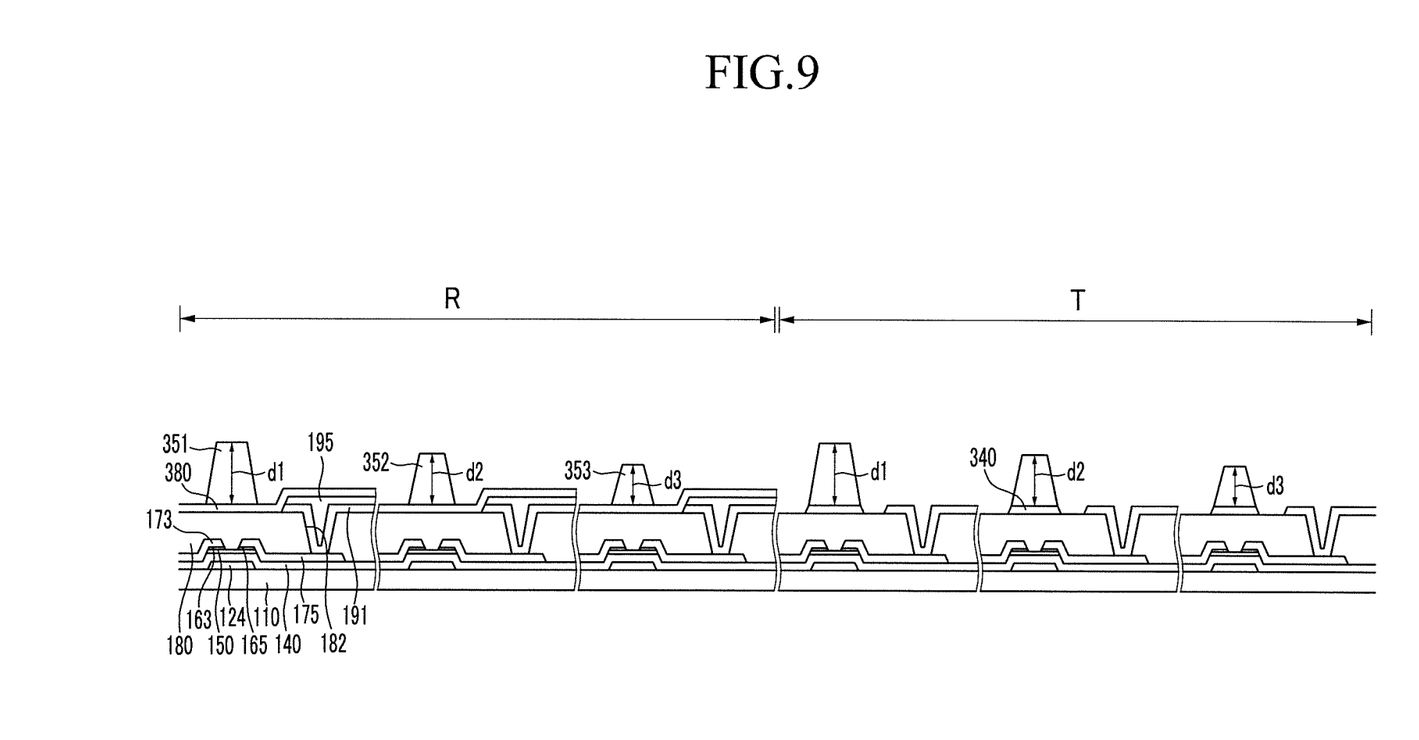
FIG. 9 is a cross-sectional view of an LCD according to a seventh exemplary embodiment of the present invention.

Furthermore, an additional support member may be formed under the column spacer (e.g., 351, 352, or 353) in the thin film transistor of the transflective LCD. The column spacer (e.g., 351, 352, or 353) is formed on the cell gap control layer 380 of the reflecting portion R, and the support member 340 is formed with the same material as that of the cell gap control layer 380 in the transmitting portion T of the thin film transistor display plate 100 of the transflective LCD to prevent or reduce pooling and smearing.

Hereinafter, a transflective LCD according to a seventh exemplary embodiment of the present invention will be described with reference to FIG. 9.

FIG. 9 is a cross-sectional view of an LCD according to a seventh exemplary embodiment of the present invention.

As shown in FIG. 9, a transflective LCD includes a transmitting portion T, through which light from a backlight device is passed, and a reflecting portion R that reflects incident light incident from an external side. A layered structure that is the same or substantially the same as that of the color filter display plate 200 according to the fifth exemplary embodiment shown in FIG. 7 is formed in the transmitting portion T. That is, a support member 340 is formed at a location on a passivation layer 180, corresponding to one of a gate line, a data line, and a thin film transistor. The support member 340 may be formed with a photo-curable organic layer. The support member 340 supports the column spacer 350 so that pooling or smearing that may occur due to pressure can be prevented or reduced. A main column spacer 351, a middle column spacer 352, and an auxiliary column spacer 353, having different respective heights and different respective area ratios, are formed on the support member 340 so that pooling and smearing can be prevented or reduced and so that a liquid crystal margin can also be improved.

In addition, in a reflecting portion R, a reflective layer 195 is formed on a pixel electrode 191, and a cell gap control layer 380 is formed on the passivation layer 180. The cell gap control layer 380 may be formed with the same material as that of the support member 340. The cell gap control layer 380 controls (e.g., causes) a cell gap of the reflecting portion R to be smaller than that of the transmitting portion T such that light phase delay of the reflecting portion R becomes almost equivalent to that of the transmitting portion T. Thus, the reflecting portion R and the transmitting portion T express uniform, or substantially uniform, color reproducibility so that display characteristics of the LCD can be improved.

The main column spacer 351, the middle column spacer 352, and the auxiliary column spacer 353, having different respective heights and area ratios, are formed on the cell gap control layer 380, and the cell gap control layer 380 supports the main column spacer 351, the middle column spacer 352, and auxiliary column spacer 353, and accordingly, pooling and smearing that may occur due to pressure can be prevented or reduced.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

| Description of Some of the Reference Characters | |
| --- | --- |
| 220: | light blocking member |
| 230: | color filter |
| 340: | support member |
| 350: | column spacer |
| 351: | main column spacer |
| 352: | middle column spacer |
| 380: | cell gap control layer |

What is claimed is:

1. A color filter display plate comprising:
    a substrate;
    a light blocking member on the substrate;
    a color filter on the substrate;
    a covering layer covering the light blocking member and the color filter;
    a common electrode on the covering layer;
    a plurality of support members on the common electrode at locations corresponding to the light blocking member; and
    a main column spacer, a middle column spacer, and an auxiliary column spacer, each of which is on a corresponding one of the support members, the column spacers having different heights and area ratios.

2. The color filter display plate of claim 1, wherein the height of the middle column spacer is less than that of the main column spacer and greater than that of the auxiliary column spacer.

3. The color filter display plate of claim 2, wherein each of the area ratios is calculated by multiplying an area of a horizontal cross-section of a corresponding one of the main column spacer, the middle column spacer, or the auxiliary column spacer with a number of the respective column spacer per unit area.

4. The color filter display plate of claim 3, wherein the support members comprise a photo-curable organic or metal layer.

5. The color filter display plate of claim 3, wherein the middle column spacer comprises a plurality of sub-middle column spacers, each having a different height or area ratio.

6. The color filter display plate of claim 3, wherein the main column spacer comprises a plurality of sub-main column spacers, each having a different height or area ratio.

7. The color filter display plate of claim 3, wherein the auxiliary column spacer comprises a plurality of sub-auxiliary column spacers, each having a different height or area ratio.

8. A color filter display plate comprising:
    a substrate comprising a reflecting portion and a transmitting portion;
    a light blocking member on the substrate;
    a color filter on the substrate and covering a part of the light blocking member;
    a covering layer covering the light blocking member and the color filter;
    a common electrode on the covering layer;
    a cell gap control layer on the common electrode in the reflecting portion;
    a plurality of support members on the common electrode in the transmitting portion of the substrate at locations corresponding to the light blocking member; and
    a main column spacer, a middle column spacer, and an auxiliary column spacer on the cell gap control layer and a corresponding one of the support members, the column spacers having different heights.

9. The color filter display plate of claim 8, wherein the cell gap control layer comprises the same material as that of the support members.

10. The color filter display plate of claim 9, wherein the height of the middle column spacer is less than that of the main column spacer and greater than that of the auxiliary column spacer.

11. The color filter display plate of claim 10, wherein an area ratio is calculated by multiplying an area of a horizontal cross-section of a corresponding one of the main column spacer, the middle column spacer, or the auxiliary column spacer with a number of the respective column spacer per unit area, the main column spacer, the middle column spacer, and the auxiliary column spacer having different area ratios.

12. The color filter display plate of claim 11, wherein the support members comprise a photo-curable organic or metal layer.

13. A flat panel display comprising:
    a color filter display plate; and
    a thin film transistor display plate facing the color filter display plate and comprising:
    a lower substrate;

a gate line on the lower substrate;

a data line crossing the gate line in an insulated manner;

a thin film transistor coupled with the gate line and the data line;

a pixel electrode coupled with the thin film transistor;

a plurality of support members, each of which is at a location corresponding to one of the gate line, the data line, or the thin film transistor; and a main column spacer, a middle column spacer, and an auxiliary column spacer on the support members and having different heights.

14. The flat panel display of claim 13, further comprising a passivation layer covering the thin film transistor, wherein the support members are on the passivation layer.

15. The flat panel display of claim 14, wherein the height of the middle column spacer is less than that of the main column spacer and greater than that of the auxiliary column spacer.

16. The flat panel display of claim 15, wherein an area ratio is calculated by multiplying an area of a horizontal cross-section of a corresponding one of the main column spacer, the middle column spacer, or the auxiliary column spacer with a number of the respective column spacer per unit area, the main column spacer, the middle column spacer, and the auxiliary column spacer having different area ratios.

17. A flat panel display comprising:

a color filter display plate; and a thin film transistor display plate facing the color filter display plate and comprising:

a lower substrate comprising a reflecting portion and a transmitting portion;

a gate line on the lower substrate;

a data line crossing the gate line in an insulated manner;

a thin film transistor coupled with the gate line and the data line;

a pixel electrode coupled with the thin film transistor;

a reflective electrode on a pixel electrode of the reflecting portion;

a cell gap control layer on the reflective electrode;

a plurality of support members, each of which is at a location corresponding to one of the gate line, the data line, or the thin film transistor in the transmitting portion; and a main column spacer, a middle column spacer, and an auxiliary column spacer on the cell gap control layer and on the support members and having different heights.

18. The flat panel display of claim 17, further comprising a passivation layer covering the thin film transistor, wherein the support members are on the passivation layer.

19. The flat panel display of claim 18, wherein the cell gap control layer comprises the same material as that of the support members.

20. The flat panel display of claim 19, wherein the height of the middle column spacer is less than that of the main column spacer and greater than that of the auxiliary column spacer.

21. The flat panel display of claim 20, wherein an area ratio is calculated by multiplying an area of a horizontal cross-section of a corresponding one of the main column spacer, the middle column spacer, or the auxiliary column spacer with a number of the respective column spacer per unit area, the main column spacer, the middle column spacer, and the auxiliary column spacer having different area ratios.

* * * * *